SUPERCONDUCTIVE BISTABLE CIRCUIT

Filed June 30, 1958

INVENTOR.
EDWARD DILLINGHAM
BY Robert H. Fraser
ATTORNEY

United States Patent Office 3,093,749
Patented June 11, 1963

3,093,749

SUPERCONDUCTIVE BISTABLE CIRCUIT

Edward Dillingham, Los Angeles, Calif., assignor, by mesne assignments, to Thompson Ramo Wooldridge Inc., Cleveland, Ohio, a corporation of Ohio Filed June 30, 1958, Ser. No. 745,515
10 Claims. (Cl. 307—88.5)

This invention relates to bistable circuits and more particularly to an improved circuit including a switchable element in the form of a superconductor which is in a superconductive condition in one stable state and an electrically resistive condition in another stable state.

In data processing systems and digital computers, bistable circuits are extensively employed as both memory units for the storage of binary digital information and as logical circuit elements to establish and control the operation, manipulation and computation of numerical data represented by electrical signals. Due to an increasing need for data processing systems and digital computers which are capable of rapidly handling and storing a large quantity of numerical data within the confines of a relatively small structure, a substantial amount of effort has been directed towards the miniaturization of each of the individual circuits which may be interconnected to form a complete system.

One promising area of investigation in which circuits of reduced size may be achieved is that of low temperature physics where certain materials exhibit a phenomenon known as superconductivity. Superconductivity may be defined as a lack of measurable electrical resistance in a material and is exhibited by many materials and compounds at temperatures approximately absolute zero (0° Kelvin). In the presence of a magnetic field superconductivity does not occur until a lower temperature is reached than that required for superconductivity in the absence of a magnetic field, which phenomenon permits the switching of a conductor from the superconductive to the resistive condition by application of a magnetic field, and returning the conductor to the superconductive condition by removal of the magnetic field. The present invention is directed to a new and improved bistable circuit employing at least one component exhibiting the phenomenon of superconductivity. Accordingly, it is a principal object of the present invention to provide a new and improved bistable circuit in which a switchable element is in a superconductive condition in one stable state and an electrically resistive condition in another stable state.

It is another object of the present invention to provide a bistable circuit in which an electrically resistive control coil connected in parallel with a superconductive element functions to latch the superconductive element in an electrically resistive condition in response to current flow through the control winding.

It is still another object of the present invention to provide a bistable circuit in which two substantially mutually exclusive electrical circuit paths are arranged to control the flow of current from a source through one circuit path in one stable state and through the other circuit path in another stable state.

Briefly, in accordance with the invention, a first circuit path includes a switchable element comprising a superconductor which is capable of being switched between a superconductive condition and an electrically resistive condition. A second circuit path is connected in parallel with the first circuit path and comprises an electrically resistive control winding which is associated with the first circuit path in such a way that a current flow through the second circuit path applies a magnetic field to the superconductor in the first circuit path to maintain the superconductor in an electrically resistive condition. The bistable circuit may be switched from one stable state to the other stable state by momentarily rendering the superconductor in the first circuit path electrically resistive so that current flow is diverted into the second circuit path to latch the circuit in the stable state in which the superconductor is electrically resistive. By momentarily decreasing the current flow through the second circuit path to reduce the magnetic field applied to the superconductor, the bistable circuit assumes the stable state in which the superconductor is superconductive.

In accordance with one embodiment of the invention, a constant current source is connected to the parallel arrangement of the first and second circuit paths so that the current from the constant current source is diverted into the control winding in one stable state and passes through the superconductor in another stable state. In another particular embodiment of the invention, two superconductive switchable elements are connected serially, each having associated therewith a separate control winding forming an alternative circuit path. When a fixed voltage within a range dependent on the resistances of the circuit elements is applied to the serially connected switchable elements, only one of the switchable elements can be superconductive and one resistive. Two stable states therefore exist, in each of which states one switchable element is superconductive and the other switchable element is resistive. The circuit can be switched from one stable state to the other by applying a signal from an external source which forces the superconductive element to become resistive and the resistive element to become superconductive. Such a signal can be a negative or positive pulse, depending on the new stable state desired, applied at the junction of the two switchable elements.

A better understanding of the invention may be had from a reading of the following detailed description and an inspection of the drawings, in which.

As noted above, at temperatures near absolute zero, some materials lose all measurable resistance to the flow of electrical current so that a conductor constructed of a material exhibiting the phenomenon assumes a superconductive condition. The temperature at which a change occurs from a normally resistive condition to a superconductive condition is called the transition temperature. For example, the following materials have a transition temperature and become superconductive at the temperatures listed:

| | ° Kelvin |
|---|---|
| Niobium | 8 |
| Lead | 7.2 |
| Vanadium | 5.1 |
| Mercury | 4.12 |
| Tantalum | 4.4 |
| Tin | 3.7 |
| Indium | 3.3 |
| Tellurium | 2.4 |
| Aluminum | 1.2 |

Only a few of the materials exhibiting superconductivity are listed above. Other elements and many alloys and compounds become superconductive at temperatures ranging between 0° and 17° Kelvin. A discussion of many such materials may be found in a book entitled "Superconductivity," by D. Schoenberg, Cambridge University Press, Cambridge, England, 1952.

The above listed transition temperatures apply only where the materials are in a substantially zero magnetic field. In the presence of a magnetic field the transition temperature is decreased so that a given material may be in an electrically resistive state even for temperatures below the normal transition temperature at which the material would be superconductive in the absence of a magnetic field.

In addition, the above listed transition temperatures apply only for values of electrical current flow which do not exceed a critical value. When a current flows through a material in excess of a critical value, the transition temperature is decreased so that the material is electrically resistive even though the temperature of the material is lower than the normal transition temperature at which the material would otherwise be superconductive. The action of a current in lowering the temperature at which a transition occurs from normal electrical resistivity to superconductivity is similar to the lowering of the transition temperature by a magnetic field for the reason that the current flowing in the material generates a magnetic field having a strength which if externally applied would lead to the same result in lowering the transition temperature.

Accordingly, when a material is held at a temperature below its normal transition temperature for a zero magnetic field, the superconductive condition of the material may be extinguished by application of a magnetic field which may originate in an external source or may be internally generated through the flow of current in the material.

Figure 1:
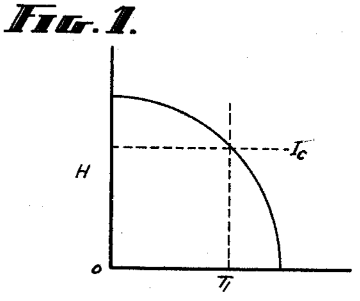
FIG. 1 is a graph of the transition temperature of a particular material subjected to a magnetic field.

FIG. 1 illustrates the variation in transition temperature ($T_c$) for a material as a function of an applied magnetic field. In the absence of a magnetic field the point at which the curve intersects the abscissa is the transition temperature at which the material becomes superconductive. For values of temperature and magnetic field falling beneath the curve, the particular material is superconductive while for values of temperature and magnetic field falling above the curve the material possesses electrical resistance.

The effect of varying the magnetic field applied to a particular material while maintaining the material at a constant temperature lower than the transition temperature is illustrated in FIG. 1 where the dashed line $T_1$ represents a constant temperature line. For a magnetic field greater than the value of the point of intersection between the line $T_1$ and the curve, the particular material is electrically resistive. However, for a magnetic field having a value less than the point of intersection between the line $T_1$ and the curve, the material is superconductive.

Since a current flowing in the material has an effect upon the transition temperature similar to a magnetic field, FIG. 1 also represents the effect of varying the current flowing through the material. For currents in excess of a critical current value ($I_c$), the material is normally resistive, and for currents less than the critical current value, the material is superconductive.

Figure 2:
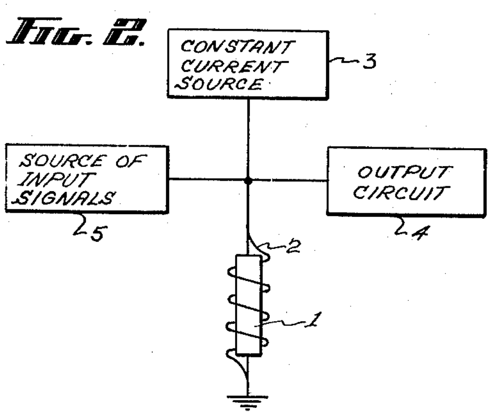
FIG. 2 is a combined block and diagrammatic illustration of a bistable circuit in accordance with the invention.

FIG. 2 illustrates a bistable circuit which is adapted to operate in accordance with the foregoing principles. The circuit of FIG. 2 includes a switchable element in the form of a superconductor 1 which may be constructed of any selected superconductive material and is held at an operating temperature below that at which the material assumes a superconductive condition. The superconductor 1 provides a first circuit path which is paralleled by a second circuit path in the form of a control winding 2 comprising a coil which is adapted to impress a magnetic field upon the superconductor 1. The control winding 2 is constructed of material which remains electrically resistive at the temperature of operation of the superconductor 1.

The parallel circuit paths of the control coil 2 and the superconductor 1 are connected serially with a constant current source 3 which provides a current of substantially constant magnitude. When the superconductor 1 is in a superconductive condition, substantially no resistance is present in the first circuit path so that substantially all of the current from the constant current source 3 passes via the superconductor 1. The value of the current from the constant current source 3 is selected so as to be less than the critical current value of the superconductor 1, and hence, the circuit may be said to have a first stable state in which the current from the constant current source 3 is passed by the superconductor 1 which is in a superconductive condition. Since the superconductor 1 presents no resistance to the flow of current, an output circuit 4 receives a voltage equal to zero, indicating the existence of the first stable state in the circuit of FIG. 2.

The circuit of FIG. 2 may be switched to a second stable state by momentarily rendering the superconductor 1 electrically resistive so as to divert the current from the constant current source 3 into the second circuit path of the control winding 2. In the arrangement of FIG. 2 the superconductor 1 may be momentarily rendered electrically resistive in response to a pulse from the source of input signals 5 which is additive with respect to the current flow from the constant current source 3, where the combined currents from the source of input signals 5 and the constant current source 3 exceed the critical current value ($I_c$) of the superconductor 1.

By making the value of the resistance exhibited by the superconductor 1 when in an electrically resistive condition substantially higher than the value of the resistance of the control winding 2, a substantial portion of the current from the constant current source 3 is diverted into the second circuit path and flows through the control winding 2 when the superconductor 1 is in an electrically resistive condition.

The control winding 2 generates a magnetic field which is impressed upon the superconductor 1 whenever a current flows through the control winding 2. As noted above, the condition of superconductivity in a material may be extinguished by either an increase in current flow through an element in excess of a critical current value, or through the application of a magnetic field. In the arrangement of FIG. 2, the superconductor 1 may be switched to an electrically resistive condition in response to current flow therethrough in excess of a critical current value and is latched in an electrically resistive condition by the application of a magnetic field from the control winding 2 in response to the diverted current from the constant current source 3. Accordingly, the circuit of FIG. 2 is capable of assuming a second stable state in which the superconductor 1 is maintained in an electrically resistive condition.

When the superconductor 1 is in an electrically resistive condition, the output circuit 4 receives a finite value of voltage since both the superconductor 1 and the control coil 2 are electrically resistive and produce a voltage drop in response to the current from the constant current source 3. Accordingly, the output circuit 4 is capable of sensing each of the two stable states of the circuit of FIG. 2 by sensing the value of the voltage appearing across the superconductor 1.

The circuit of FIG. 2 may be switched from the stable state in which the superconductor 1 is electrically resistive to the stable state in which the superconductor 1 is in a superconductive condition by momentarily reducing the current flow through the control winding 2. In the arrangement of FIG. 2, the momentary reduction in current flow through the control winding 2 may be accomplished by applying a pulse to the circuit from a source of input signals 5 having a polarity which is subtractive with respect to the current flow from the constant current source 3.

Accordingly, where the constant current source 3 is positive with respect to ground reference potential, a positive going pulse from the source of input signals 5 causes the circuit of FIG. 2 to assume a stable state in which the superconductor 1 becomes electrically resistive and a voltage appears at the output circuit 4, and where a pulse from the source of input signals 5 is negative, the circuit assumes the stable state in which the superconductor 1 is in a superconductive condition and substantially zero output voltage appears at the output circuit 4.

Figure 3:
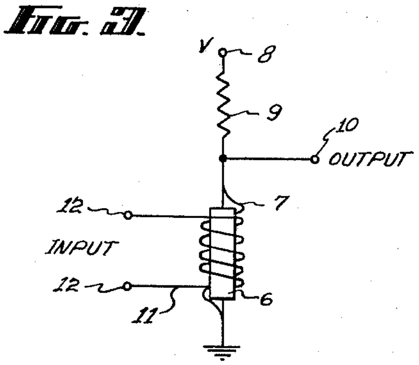
FIG. 3 is a combined schematic circuit diagram and diagrammatic illustration of an alternative arrangement of the bistable circuit in accordance with the invention.

FIG. 3 illustrates an alternative arrangement of the invention in which a first circuit path including a superconductor 6 is paralleled with a second circuit path including a control winding 7. In FIG. 3 a simple form of constant current source is illustrated in which a voltage may be applied to a terminal 8 from which a resistor 9 having a relatively large value is connected serially with the superconductor 6. An output terminal 10 may be connected to a suitable output circuit as described above in connection with FIG. 2.

In operation, the circuit of FIG. 3 is similar to that of FIG. 2 except that an alternative arrangement for switching the circuit from one stable state to the other is provided. The alternative arrangement of FIG. 3 includes an input winding 11 which is connected between a pair of input terminals 12. The winding 11 may comprise a coil surrounding the superconductor 6 so as to impress a magnetic field thereon in response to a control current. The circuit of FIG. 3 may be switched from one stable state to the other stable state by applying input pulses to the terminals 12. For example, assuming the superconductor 6 is in a superconductive condition, a pulse applied to the terminals 12 produces a current flow through the winding 11 which applies a magnetic field to the superconductor 6 of a magnitude sufficient to render the superconductor 6 electrically resistive. The current flow from the resistor 9 is diverted to the control winding 7 when the superconductor 6 is electrically resistive and the control winding 7 is arranged to apply a magnetic field to the superconductor 6 in response to current flow therethrough which maintains the superconductor 6 in the electrically resistive condition established by the magnetic field from the input winding 11. Accordingly, the circuit of FIG. 3 assumes a stable state in which an output voltage appears at the terminal 10.

In order to switch the bistable circuit of FIG. 3 from the stable state in which the superconductor 6 is electrically resistive to the stable state in which the superconductor 6 is superconductive, a pulse may be applied to the input terminals 12 to pass a current through the winding 11 which generates a magnetic field which is subtractive with respect to the magnetic field generated by the control winding 7. Where the subtractive magnetic field produced by current flow through the winding 11 lowers the net magnetic field impressed upon the superconductor 6 below a critical value, the superconductor 6 resumes a superconductive condition and substantially all of the current from the terminal 8 passes through the superconductor 6 so that the circuit of FIG. 3 assumes a stable state in which substantially no output voltage appears at the terminal 10.

Figure 4:
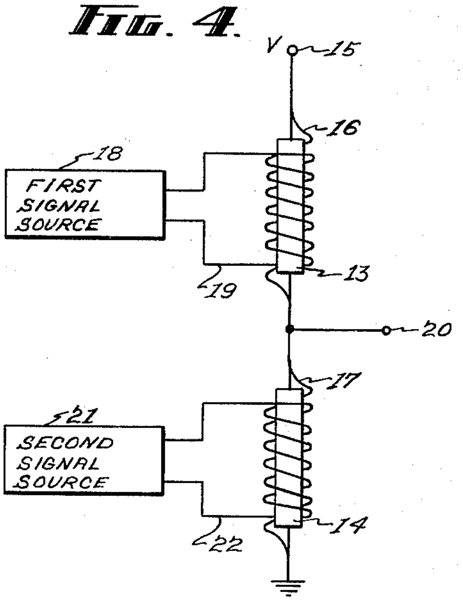
FIG. 4 is a combined block and diagrammatic illustration of the bistable circuit in accordance with the invention incorporating two separate switchable elements.

FIG. 4 illustrates an alternative embodiment of the invention in which a pair of superconductors 13 and 14 are connected serially between a voltage terminal 15 and ground reference potential. Connected in parallel with the upper superconductor 13 is a control winding 16 and connected in parallel with the lower superconductor 14 is a control winding 17. The control windings 16 and 17 afford alternate current paths for latching the superconductors 13 and 14 in an electrically resistive condition in the manner described above in connection with FIGS. 2 and 3.

A voltage may be applied to the terminal 15, with a magnitude such that the resultant current is greater than that required in either control coil to maintain the associated superconductor in the resistive condition, but less than that required in either superconductor to maintain that superconductor in the resistive condition. Thus, two stable states exist, in one of which states the superconductor 13 is in the superconductive condition and the superconductor 14 is in the resistive condition, while in the other stable state these conditions are reversed. Two other possible states exist, one in which both superconductors are resistive and one in which both superconductors are in the superconductive condition, but both of these states are unstable.

Assuming that the upper superconductor 13 is in a superconductive condition and that the lower superconductor 14 is in an electrically resistive condition in which current flows through the control winding 17, a signal from a first signal source 18 may be applied to an input winding 19 associated with the superconductor 13 to momentarily render the superconductor 13 electrically resistive. The increased resistance in the series circuit from the terminal 15 to the lower superconductor 14 reduces the current flow through the lower control winding 17 to allow the lower superconductor 14 to assume a superconductive condition. At the same time, the electrical resistance of the upper superconductor 13 diverts the current flow from the terminal 15 through the control winding 16 to latch the upper superconductor 13 in an electrically resistive condition.

Accordingly, through the application of a signal from a first signal source 18 to the input winding 19, the circuit of FIG. 4 may be switched from a stable condition of operation in which a finite voltage appears at an output terminal 20 to a condition in which substantially zero voltage appears at the output terminal 20 by virtue of elimination of the voltage drop across the lower superconductor 14.

In a similar fashion, the circuit of FIG. 4 may be switched from the stable state in which no voltage appears at the terminal 20 to the stable state at which a finite voltage appears at the terminal 20 by applying a pulse from a second signal source 21 to an input winding 22 associated with the lower superconductor 14. As before, the current flow through the input winding 22 momentarily applies a magnetic field to the lower superconductor 14 which renders the lower superconductor 14 electrically resistive to divert the current flow through the control winding 17 which latches the lower superconductor 14 in an electrically resistive condition so that an output voltage appears at the output terminal 20.

At the same time, the current flow through the control winding 16 associated with the upper superconductor 13 drops to a value at which the upper superconductor 13 assumes a superconductive condition. Thus, the circuit of FIG. 4 may be employed as a bistable circuit to receive input signals from two separate signal input sources for switching the circuit from one stable state to another stable state. However, in place of the input windings 19 and 22, suitable input pulses may be applied directly to the superconductors 13 and 14 to switch the circuit from one stable state of operation to the other in a manner similar to that shown and described in connection with FIG. 2.

Although the superconductors and control elements have each been illustrated diagrammatically in FIGS. 2–4 as a cylindrical superconductor surrounded by a helical control winding, it will be appreciated that other configurations may be employed as well. For example, the superconductor may comprise a thin evaporated layer of a suitable material with an alternative circuit path being adapted to impress a magnetic field upon the superconductor. The use of the term "control winding" to describe the function of the alternative circuit path in applying a magnetic field to the superconductor is intended to include any alternative circuit path which is capable of exerting a control over the superconductor in response to current flow therethrough.

Although specific individual arrangements have been illustrated to afford a basis for explaining the operation of the invention, it will be appreciated that many such circuits may be interconnected in a complete system. For example, a large number of circuits might be connected in a matrix to function as a memory unit in digital computers. Another example of the manner in which the circuits of the invention may be interconnected is in the logical and arithmetic portions of a digital computer in which bistable circuits are frequently employed as circuit elements.

Figure 5:
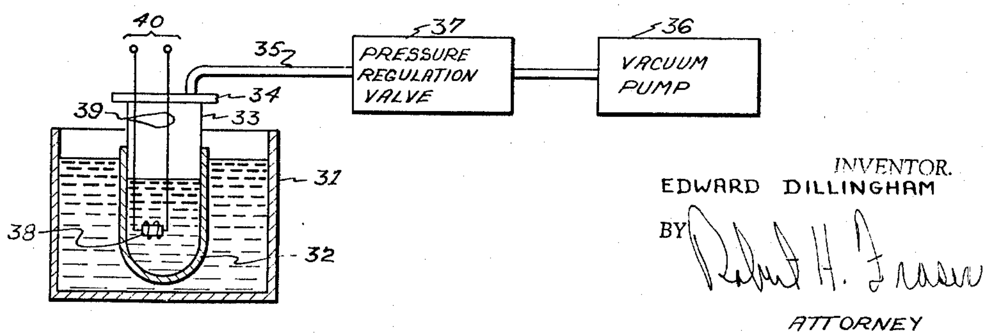
FIG. 5 is a diagrammatic view of apparatus for maintaining the bistable circuits of the present invention at a selected temperature at which the phenomenon of superconductivity occurs in a portion of the circuit.

FIG. 5 is a diagrammatic illustration of an arrangement for maintaining the circuits of the present invention at a suitable low temperature near absolute zero. In FIG. 5 there is shown an exterior insulated container 31 which is adapted to hold a coolant such as liquid nitrogen. Within the container 31 an inner insulated container 32 is suspended for holding a coolant, such as liquid helium, which maintains the circuits of the invention at the proper operating temperature. The top of the container 32 may be sealed by a sleeve 33 and lid 34 through which a conduit 35 connects the inner chamber with a vacuum pump 36 and a pressure regulation valve 37. The pump 36 functions to lower the atmospheric pressure within the chamber so as to control the temperature of the helium. The pressure regulation valve 37 functions to regulate the pressure within the chamber so that the temperature is held constant. One or more circuits 38 of the invention may be suspended in the liquid helium at the proper operating temperature at which the circuit components are superconducting. Connection to the circuits 38 is made by the lead-in wires 39 which also may be constructed of a superconducting material within the cooled region to minimize resistance. The lead-in wires 39 extend through the lid 34 to the terminals 40.

By means of the invention a new and improved bistable circuit employing superconductive elements is provided. Due to the simplicity of construction of the circuits, a high degree of reliability of operation may be achieved. Although particular structural arrangements have been illustrated and described herein, it is intended that these arrangements be by way of example only. Accordingly, the invention should be given the full scope of any alternative arrangements or modifications falling within the scope of the annexed claims.

What is claimed is:

1. A bistable circuit including the combination of a first circuit path comprising a superconductor which is capable of being switched from a superconductive condition to an electrically resistive condition, a second circuit path having common connections with said first circuit path at the ends of said superconductor comprising a control winding for impressing a magnetic field upon the superconductor, a constant current source connected serially with said first and second circuit paths, and means coupled to the superconductor for switching the superconductor between a superconductive condition and an electrically resistive condition whereby in one stable state the superconductor is in a superconductive condition with substantially all of the current from the constant current source passing through the first circuit path and in a second stable state the superconductor is in an electrically resistive condition with substantially all of the current from the constant current source passing through the second circuit path.

2. Apparatus in accordance with claim 1 in which the switching means comprises an input winding for impressing a magnetic field upon the superconductor for momentarily switching the superconductor between a superconductive condition and an electrically resistive condition whereby the current from the constant current source may be diverted to a selected one of the first and second circuit paths to place the bistable circuit in a selected stable state.

3. A bistable circuit including the combination of a first circuit path including a superconductor which is capable of being switched from a superconductive condition to an electrically resistive condition, a second circuit path comprising a control winding for impressing a magnetic field on the superconductor, said first and second circuit paths having common connections between corresponding ends of said superconductor and said control winding, a constant current source connected serially with the first and second circuit paths, and means for momentarily switching the superconductor between a superconductive condition and an electrically resistive condition whereby in one stable state substantially all of the current from the constant current source passes through the first circuit path and in a second stable state sufficient current from the constant current source passes through the control winding in the second circuit path to impress a magnetic field on the superconductor to maintain the superconductor in an electrically resistive condition.

4. A bistable circuit including the combination of a switchable element which is capable of assuming a superconductive condition in one stable state and an electrically resistive condition in another stable state, a control coil connected directly across the switchable element, said control coil being magnetically coupled to said switchable element, means passing a current through the control coil to sustain the switchable element in an electrically resistive condition, and means for momentarily reducing the current flow through the control coil to switch the bistable circuit to a stable state in which the switchable element is in a superconductive condition.

5. A bistable circuit including the combination of a switchable element which is capable of assuming a superconductive condition in one stable state and an electrically resistive condition in another stable state, a control coil connected directly across the switchable element, said control coil being magnetically coupled to said switchable element, means passing a current through the control coil to sustain the switchable element in an electrically resistive condition, and an input coil for impressing a magnetic field upon the switchable element to switch the bistable circuit between a stable state in which the switchable element is in a superconductive condition and a stable state in which the switchable element is in an electrically resistive condition.

6. A bistable circuit including the combination of a switchable element comprising a superconductor which is capable of being switched between a superconductive condition and an electrically resistive condition in response to current flow therethrough in excess of a critical current value, an electrically resistive control coil connected directly in parallel with the switchable element, said control coil being magnetically coupled to the switchable element for impressing a magnetic field on the superconductor in response to current flow through the control coil, a constant current source connected serially with the switchable element, means for momentarily increasing the value of current flow through the switchable element in excess of said critical current value so that the superconductor is rendered electrically resistive and substantially all of the current from the constant current source passes through the control coil to generate a magnetic field sufficiently large to hold the switchable element in an electrically resistive condition, and means for momentarily reducing the value of current flow through the control coil to allow the switchable element to assume its superconductive condition.

7. A bistable circuit including the combination of a pair of substantially mutually exclusive parallel circuit paths, a first one of said pair of circuit paths comprising a switchable element which is capable of assuming a superconductive condition in one stable state and an electrically resistive condition in another stable state, a constant current source connected in series with said pair of circuit paths, a second one of said circuit paths comprising a control coil for maintaining the switchable element in the first circuit path in an electrically resistive condition in response to a current flow therethrough, said circuit paths having common connections at corresponding ends of said switchable element and said control coil, means for momentarily rendering the switchable element electrically resistive to cause the current from said constant current source to flow through the control coil, and means for momentarily decreasing the current flow through the control coil to cause the switchable element to assume a superconductive condition.

8. A bistable circuit including the combination of a pair of substantially mutually exclusive parallel circuit paths, a first one of said pair of circuit paths comprising a switchable element which is capable of assuming a superconductive condition in one stable state and an electrically resistive condition in another stable state, a constant current source connected in series with said pair of circuit paths, a second one of said circuit paths comprising a control coil for maintaining the switchable element in the first circuit path in an electrically resistive condition in response to a current flow therethrough, said circuits paths having common connections at corresponding ends of said switchable element and said control coil, means for momentarily rendering the switchable element electrically resistive to cause the current from said constant current source to flow through the control coil and to impress a magnetic field on the switchable element to maintain the switchable element in a resistive condition, means for momentarily decreasing the current flow through the control coil to cause the switchable element to assume a superconductive condition, and a voltage responsive output circuit connected across the switchable element for sensing the appearance of a voltage across the switchable element representing one stable state and for sensing the lack of appearance of a voltage across the switchable element in another stable state.

9. A bistable circuit including the combination of a first superconductor having a given critical current value at which the superconductor becomes electrically resistive in response to current flow therethrough, a first electrically resistive control coil connected directly in parallel with the first superconductor and surrounding at least a portion of the first superconductor for impressing a magnetic field on the first superconductor in response to a current flow through the first electrically resistive control coil, a second superconductor connected serially with the first superconductor having a given critical current value at which the superconductor becomes electrically resistive in response to current flow therethrough, a second electrically resistive control coil connected directly in parallel with the second superconductor and surrounding at least a portion of the second superconductor for impressing a magnetic field on the second superconductor in response to a current flow through the second electrically resistive control coil, means for passing a current through the first and second superconductors having a value in excess of the critical current value, and means for applying input signals to said first and second superconductors to switch the circuit from a first stable state in which the first superconductor is in a superconductive condition and the second superconductor is in an electrically resistive condition to a second stable state in which the first superconductor is in an electrically resistive condition and the second superconductor is in a superconductive condition.

10. Apparatus in accordance with claim 9 in which the means for applying input signals comprise first and second windings each of which is magnetically coupled to one of the superconductors for momentarily rendering its associated superconductor electrically resistive in response to an input signal.

References Cited in the file of this patent

UNITED STATES PATENTS

| | | |
|---|---|---|
| 1,948,209 | Fichandler | Feb. 20, 1934 |
| 2,832,897 | Buck | Apr. 29, 1958 |
| 2,877,448 | Nyberg | Mar. 10, 1959 |
| 2,913,881 | Garwin | Nov. 24, 1959 |
| 2,935,694 | Schmitt | May 3, 1960 |
| 2,966,598 | Mackay | Dec. 27, 1960 |
| 2,977,575 | Hagelbarger et al. | Mar. 28, 1961 |
| 2,980,807 | Groetzinger et al. | Apr. 18, 1961 |